US 9,581,446 B2

(12) United States Patent
Nakagawa

(10) Patent No.: US 9,581,446 B2
(45) Date of Patent: Feb. 28, 2017

(54) VIBRATING ELEMENT WITH AN INCREASED AMOUNT OF CHANGE IN DETUNING FREQUENCY PER UNIT MASS, VIBRATOR, ELECTRONIC APPARATUS, AND MOVING OBJECT

(71) Applicant: Seiko Epson Corporation, Tokyo (JP)

(72) Inventor: Keiji Nakagawa, Minowa (JP)

(73) Assignee: Seiko Epson Corporation (JP)

( * ) Notice: Subject to any disclaimer, the term of this patent is extended or adjusted under 35 U.S.C. 154(b) by 245 days.

(21) Appl. No.: 14/528,460

(22) Filed: Oct. 30, 2014

(65) Prior Publication Data

US 2015/0114117 A1 Apr. 30, 2015

(30) Foreign Application Priority Data

Oct. 31, 2013 (JP) ................................ 2013-226086

(51) Int. Cl.
*G01C 19/00* (2013.01)
*G01C 19/5607* (2012.01)
*G01C 19/5733* (2012.01)
*G01C 19/5762* (2012.01)

(52) U.S. Cl.
CPC ..... *G01C 19/5607* (2013.01); *G01C 19/5733* (2013.01); *G01C 19/5762* (2013.01)

(58) Field of Classification Search
CPC ............ G01C 19/5607; H01L 41/0472; H01L 41/107; H01L 41/25; H01L 41/047; H03H 9/21; Y10T 29/42
See application file for complete search history.

(56) References Cited

U.S. PATENT DOCUMENTS

| | | | | |
|---|---|---|---|---|
| 5,476,008 A | * | 12/1995 | Pinson | G01C 19/5607 310/367 |
| 6,046,531 A | * | 4/2000 | Kikuchi | G01C 19/5621 310/311 |
| 6,698,292 B2 | * | 3/2004 | Kikuchi | G01C 19/5607 73/504.12 |

(Continued)

FOREIGN PATENT DOCUMENTS

| | | | |
|---|---|---|---|
| CN | 104596492 A * | 5/2015 | ......... G01C 19/5607 |
| JP | 01-081514 | 5/1989 | |

(Continued)

*Primary Examiner* — Harshad R Patel
*Assistant Examiner* — Samir M Shah
(74) *Attorney, Agent, or Firm* — Harness, Dickey & Pierce, P.L.C.

(57) ABSTRACT

A vibrating element includes: drive vibrating arm supported to the base portion and extending in a direction of the second axis; and detection vibrating arm supported to the base portion at a position different from the drive vibrating arm and extending in the direction of the second axis. When the vibrating element is subjected to rotation about the second axis while the drive vibrating arm being reciprocally driven in a direction of the first axis, an amount of displacement of the detection vibrating arm in a direction of the third axis at a position distant from the base portion by a distance y1 along the direction of the second axis is greater than an amount of displacement of the drive vibrating arm in the direction of the third axis at a position distant from the base portion by the distance y1 along the direction of the second axis.

20 Claims, 13 Drawing Sheets

(56) References Cited

U.S. PATENT DOCUMENTS

| | | | |
|---|---|---|---|
| 7,043,986 B2 * | 5/2006 | Kikuchi | G01C 19/5607 310/370 |
| 7,412,885 B2 * | 8/2008 | Ogura | G01C 19/5607 310/370 |
| 7,900,514 B2 * | 3/2011 | Kurakawa | G01C 19/5607 310/370 |
| 8,539,833 B2 * | 9/2013 | Amemiya | G01C 19/5607 73/504.12 |
| 8,973,440 B2 * | 3/2015 | Matsumoto | H03H 9/02 73/504.12 |
| 9,013,093 B2 * | 4/2015 | Yamaguchi | H01L 41/053 310/348 |
| 9,341,643 B2 * | 5/2016 | Yamaguchi | G01P 9/04 |
| 2001/0010173 A1 * | 8/2001 | Inoue | G01C 19/5607 73/504.16 |
| 2006/0107739 A1 * | 5/2006 | Ogura | G01C 19/5607 73/504.12 |
| 2012/0126664 A1 * | 5/2012 | Ogura | G01C 19/5607 310/312 |
| 2012/0318059 A1 * | 12/2012 | Otsuki | H01L 23/057 73/504.12 |
| 2013/0205898 A1 * | 8/2013 | Nakagawa | G01C 19/5621 73/504.16 |
| 2013/0255379 A1 * | 10/2013 | Nakagawa | G01C 19/5621 73/504.16 |
| 2013/0285508 A1 | 10/2013 | Nakagawa | |
| 2013/0320816 A1 * | 12/2013 | Yamaguchi | H01L 41/332 310/367 |

FOREIGN PATENT DOCUMENTS

| | | | | |
|---|---|---|---|---|
| JP | 2001-012952 A | 1/2001 | | |
| JP | 4107768 B2 | 6/2008 | | |
| JP | 2009236885 A * | 10/2009 | | G01C 19/5607 |
| JP | 2013-205328 A | 10/2013 | | |
| JP | 2013-205329 A | 10/2013 | | |
| WO | WO 2007125615 A1 * | 11/2007 | | G01C 19/5607 |

* cited by examiner

VIBRATING ELEMENT WITH AN INCREASED AMOUNT OF CHANGE IN DETUNING FREQUENCY PER UNIT MASS, VIBRATOR, ELECTRONIC APPARATUS, AND MOVING OBJECT

BACKGROUND

1. Technical Field

The present invention relates to a vibrating element, a vibrator, an electronic apparatus, and a moving object.

2. Related Art

In the related art, for example, angular velocity sensors (vibration gyro sensors) that detect a physical quantity such as an angular velocity or an acceleration and are used for body control in vehicles, self-position detection of car navigation systems, vibration control correction (so-called camera-shake correction) for digital cameras or video camcorders, or the like have been known.

In an angular velocity sensor including a vibrating element called an "H type" including a pair of drive vibrating arms and a pair of detection vibrating arms, the drive vibrating arms flexurally vibrate (drive-vibrate) close to or away from each other by energization. In this state, when an angular velocity about a predetermined axis is applied to the angular velocity sensor, the drive vibrating arms flexurally vibrate in opposite directions with the Coriolis force, and consequently, the detection vibrating arms flexurally vibrate (detection-vibrate) in opposite directions. With the detection vibrations of the detection vibrating arms, charge is generated at electrodes provided on the detection vibrating arms. By detecting the charge, the angular velocity applied to the angular velocity sensor can be obtained.

In such an angular velocity sensor, adjustments of frequencies such as the resonance frequency of drive vibration of the drive vibrating arm, the resonance frequency of detection vibration of the detection vibrating arm, and a detuning frequency as a difference between the resonance frequency of the drive vibration and the resonance frequency of the detection vibration are carried out for preventing variations in the frequencies of products after manufacture (for example, refer to Japanese Patent No. 4107768). For example, the adjustment of the detuning frequency is carried out by changing the mass of the drive vibrating arm or the detection vibrating arm by providing a weight on the drive vibrating arm or the detection vibrating arm, or removing a portion of the provided weight. The resonance frequency of drive vibration of the drive vibrating arm is moved away from the resonance frequency of detection vibration of the detection vibrating arm for the reason that if they are proximate to each other, noise is introduced into signals output from the angular velocity sensor due to the influence of the drive vibration of the drive vibrating arm.

However, in the angular velocity sensor in the related art, the amount of change in detuning frequency per unit mass is small. For this reason, the mass of the drive vibrating armor the detection vibrating arm needs to be greatly changed to bring the detuning frequency to a target value, which involves a problem of disturbing the balance of the drive vibrating arm or the detection vibrating arm and thus deteriorating characteristics.

SUMMARY

An advantage of some aspects of the invention is to provide a vibrating element capable of increasing the amount of change in detuning frequency per unit mass, a vibrator, an electronic apparatus, and a moving object.

The invention can be implemented as the following forms or application examples.

Application Example 1

This application example of the invention is directed to a vibrating element whose normal is, when assuming a first axis, a second axis, and a third axis intersecting each other, the third axis, the vibrating element including: a base portion; at least one drive vibrating arm supported to the base portion and extending in a direction of the second axis; and at least one detection vibrating arm supported to the base portion at a position different from the drive vibrating arm and extending in the direction of the second axis, wherein when the vibrating element is subjected to rotation about the second axis while the drive vibrating arm being reciprocally driven in a direction of the first axis, an amount of displacement of the detection vibrating arm in a direction of the third axis at a position distant from the base portion by a distance y1 along the direction of the second axis is greater than an amount of displacement of the drive vibrating arm in the direction of the third axis at a position distant from the base portion by the distance y1 along the direction of the second axis.

With this configuration, in each of the case where the mass of the drive vibrating arm is changed and the case where the mass of the detection vibrating arm is changed, the amount of change in detuning frequency per unit mass can be increased. Due to this, in the adjustment of the detuning frequency, changes in the mass, shape, and the like of the drive vibrating arm and the detection vibrating arm can be reduced, which makes it possible to prevent deterioration of the characteristics of the vibrating element.

Application Example 2

In the vibrating element according to the application example of the invention, it is preferable that when the amount of displacement of the detection vibrating arm is db and the amount of displacement of the drive vibrating arm is da, a ratio db/da of the amount of displacement db to the amount of displacement da is 1.5 or more and 9 or less.

Due to this, in each of the case where the mass of the drive vibrating arm is changed and the case where the mass of the detection vibrating arm is changed, the amount of change in detuning frequency per unit mass can be increased while ensuring sufficient sensitivity.

Application Example 3

In the vibrating element according to the application example of the invention, it is preferable that the vibrating element includes a pair of the drive vibrating arms and a pair of the detection vibrating arms arranged coaxially with the pair of drive vibrating arms, that when the vibrating element is subjected to rotation about the second axis while the pair of drive vibrating arms being reciprocally driven in the direction of the first axis, the pair of drive vibrating arms are reciprocally driven in opposite directions along the direction of the third axis, and the pair of detection vibrating arms are reciprocally driven in opposite directions along the direction of the third axis, and that the drive vibrating arm and the detection vibrating arm arranged coaxially with each other in the pair of drive vibrating arms and the pair of detection vibrating arms are reciprocally driven in opposite directions.

With this configuration, detection can be carried out more reliably.

Application Example 4

In the vibrating element according to the application example of the invention, it is preferable that the vibrating element includes a pair of the drive vibrating arms and a pair of the detection vibrating arms arranged coaxially with the pair of drive vibrating arms, that when the vibrating element is subjected to rotation about the second axis while the pair of drive vibrating arms being reciprocally driven in the direction of the first axis, the pair of drive vibrating arms are reciprocally driven in opposite directions along the direction of the third axis, and the pair of detection vibrating arms are reciprocally driven in opposite directions along the direction of the third axis, and that the drive vibrating arm and the detection vibrating arm arranged coaxially with each other in the pair of drive vibrating arms and the pair of detection vibrating arms are reciprocally driven in the same direction.

With this configuration, detection can be carried out more reliably.

Application Example 5

In the vibrating element according to the application example of the invention, it is preferable that the detection vibrating arm is longer than the drive vibrating arm.

With this configuration, in each of the case where the mass of the drive vibrating arm is changed and the case where the mass of the detection vibrating arm is changed, the amount of change in detuning frequency per unit mass can be increased.

Application Example 6

In the vibrating element according to the application example of the invention, it is preferable that the detection vibrating arm is shorter than the drive vibrating arm.

With this configuration, in each of the case where the mass of the drive vibrating arm is changed and the case where the mass of the detection vibrating arm is changed, the amount of change in detuning frequency per unit mass can be increased.

Application Example 7

This application example of the invention is directed to a vibrator including: the vibrating element according to the application example of the invention; and a package accommodating the vibrating element.

With this configuration, advantageous effects similar to those of the vibrating element according to the application example of the invention are obtained.

Application Example 8

This application example of the invention is directed to an electronic apparatus including the vibrating element according to the application example of the invention.

With this configuration, advantageous effects similar to those of the vibrating element according to the application example of the invention are obtained.

Application Example 9

This application example of the invention is directed to a moving object including the vibrating element according to the application example of the invention.

With this configuration, advantageous effects similar to those of the vibrating element according to the application example of the invention are obtained.

BRIEF DESCRIPTION OF THE DRAWINGS

The invention will be described with reference to the accompanying drawings, wherein like numbers reference like elements.

FIGS. 3A and 3B are diagrams showing a drive vibrating arm of the vibrator shown in FIG. 1, in which FIG. 3A is an enlarged plan view, and FIG. 3B is an enlarged cross-sectional view.

FIGS. 4A and 4B are diagrams showing a detection vibrating arm of the vibrator shown in FIG. 1, in which FIG. 4A is an enlarged plan view, and FIG. 4B is an enlarged cross-sectional view.

DESCRIPTION OF EXEMPLARY EMBODIMENTS

Hereinafter, a vibrating element, a vibrator, an electronic apparatus, and a moving object according to the invention will be described in detail based on preferred embodiments shown in the accompanying drawings.

First Embodiment

Figure 1:
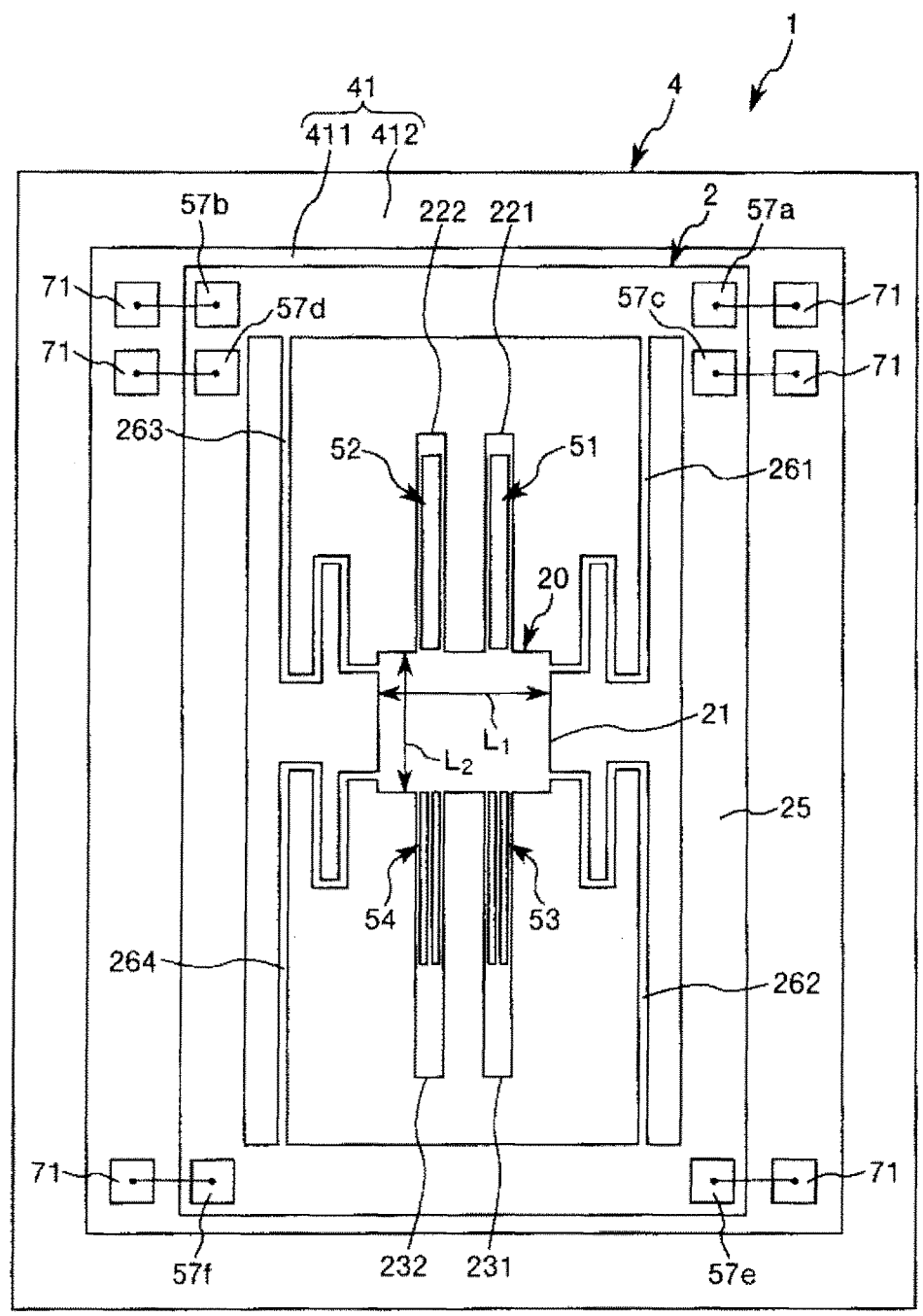
FIG. 1 is a plan view schematically showing a first embodiment of a vibrator (vibrating element) according to the invention.
Figure 2:
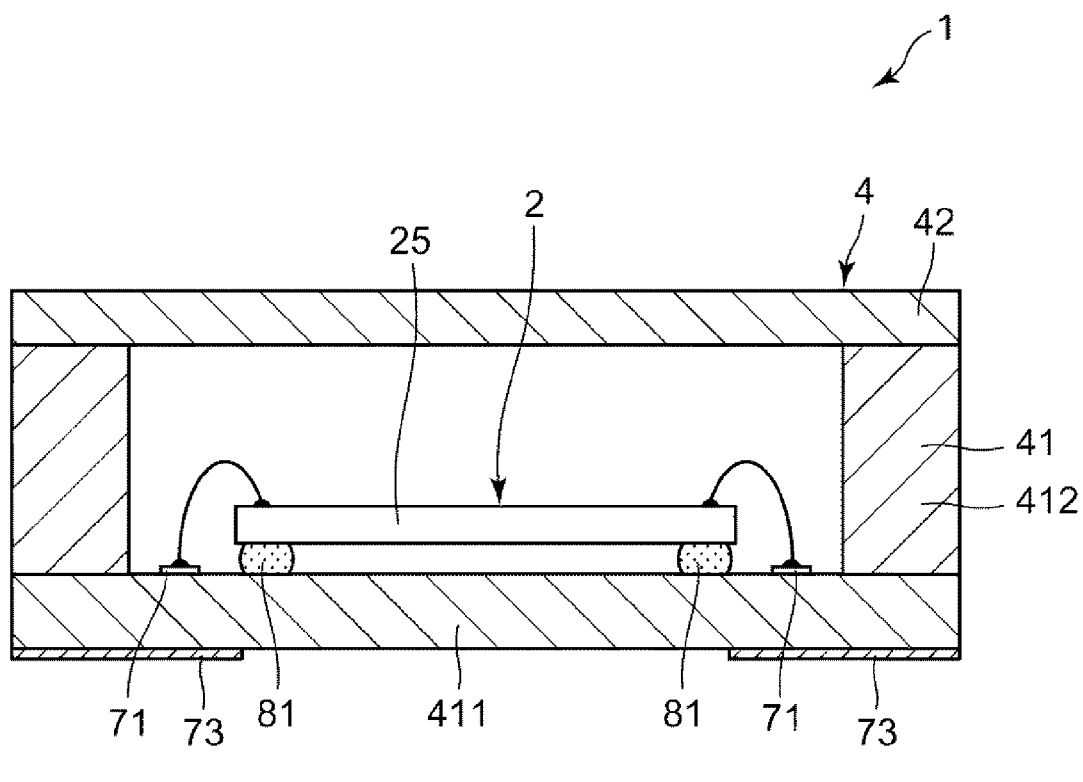
FIG. 2 is a cross-sectional view of the vibrator shown in FIG. 1.
Figure 3A:
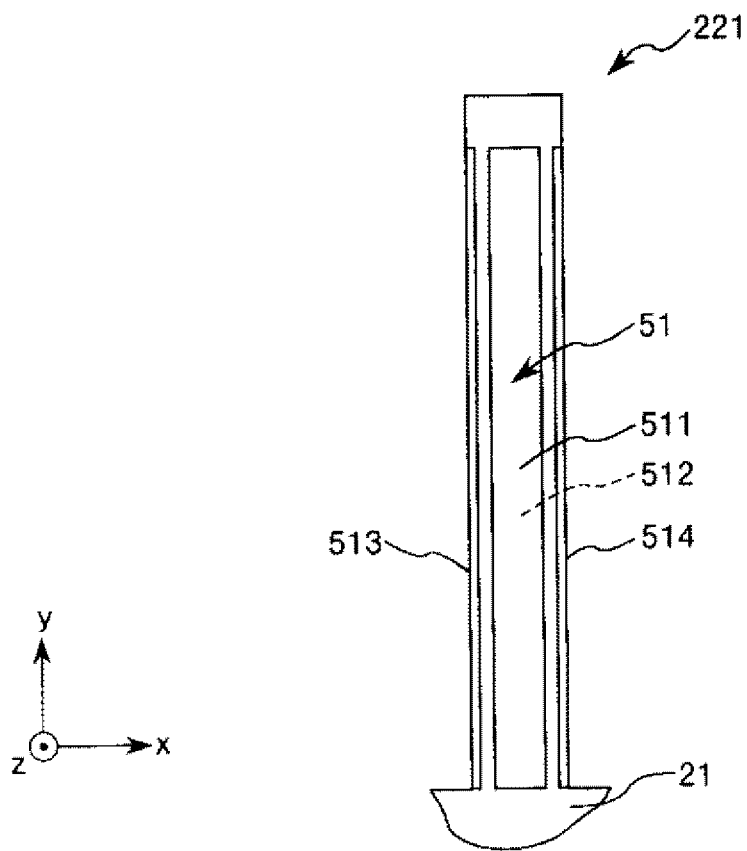
Figure 3B:
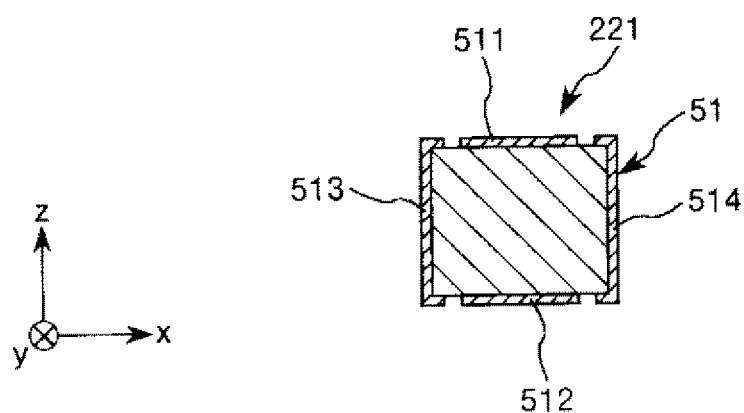
Figure 4A:
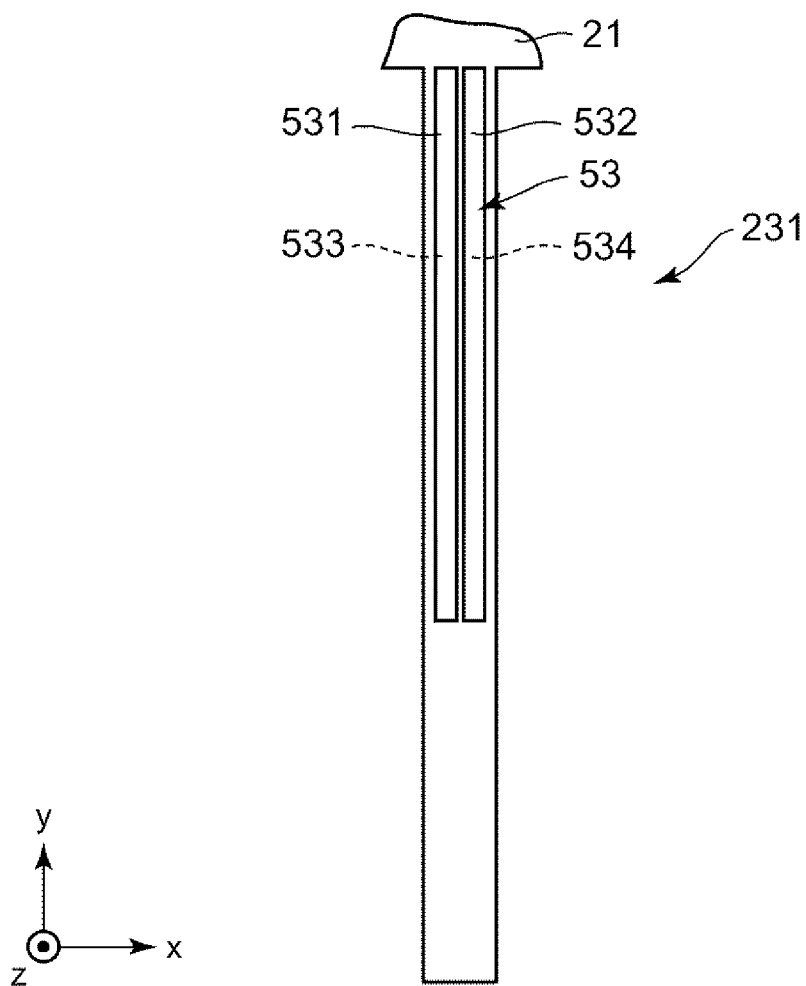
Figure 4B:
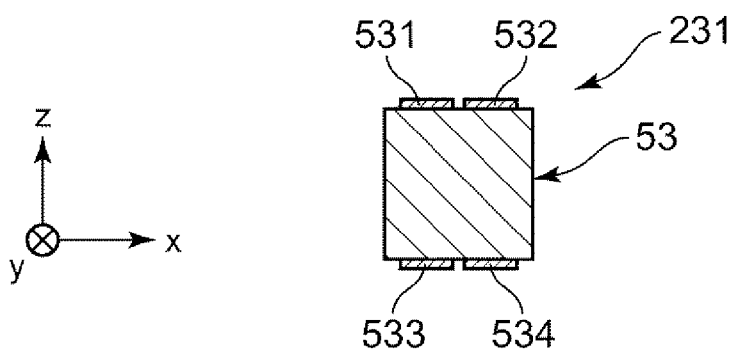
Figure 5:
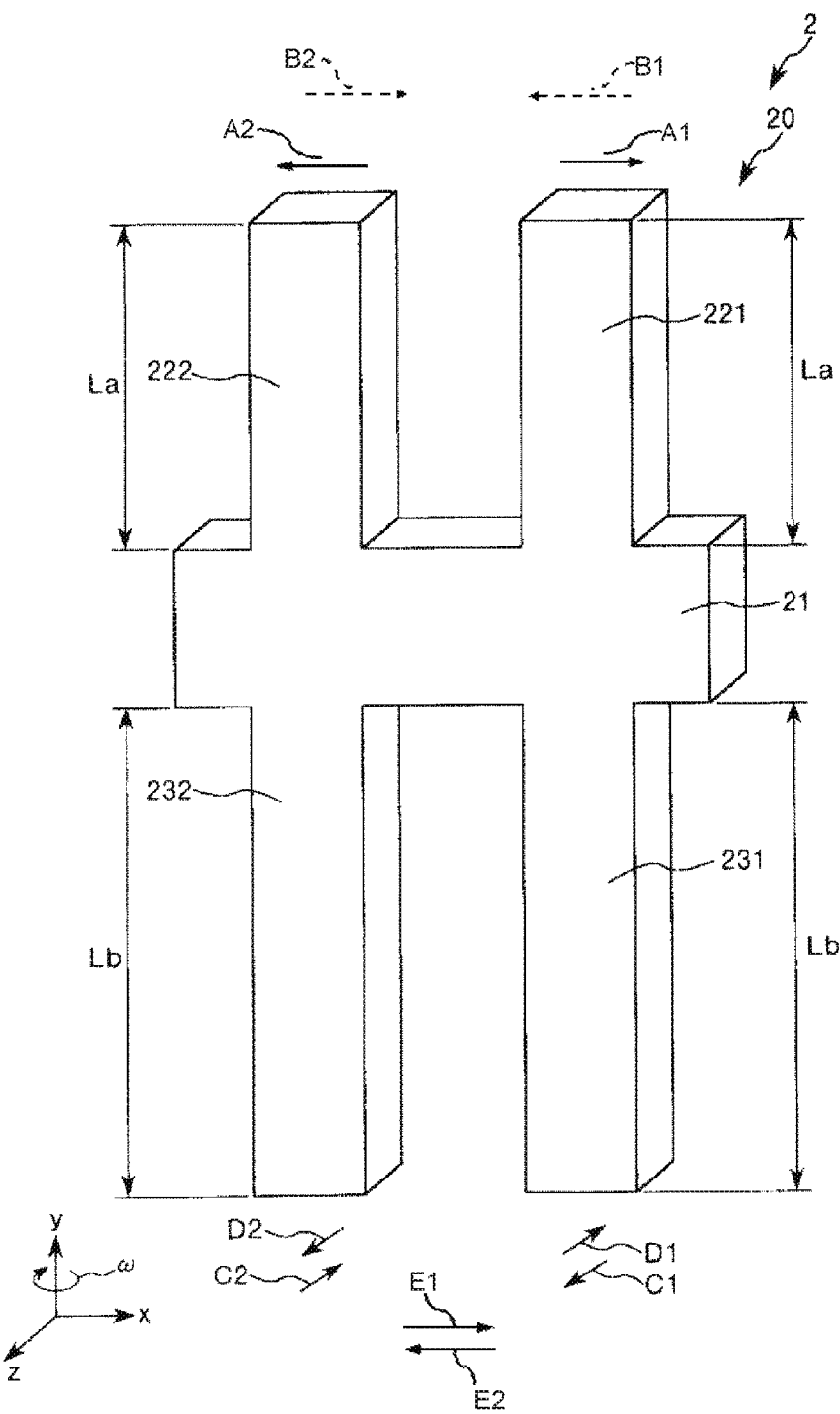
FIG. 5 is a perspective view of a main portion of the vibrating element of the vibrator shown in FIG. 1.
Figure 6:
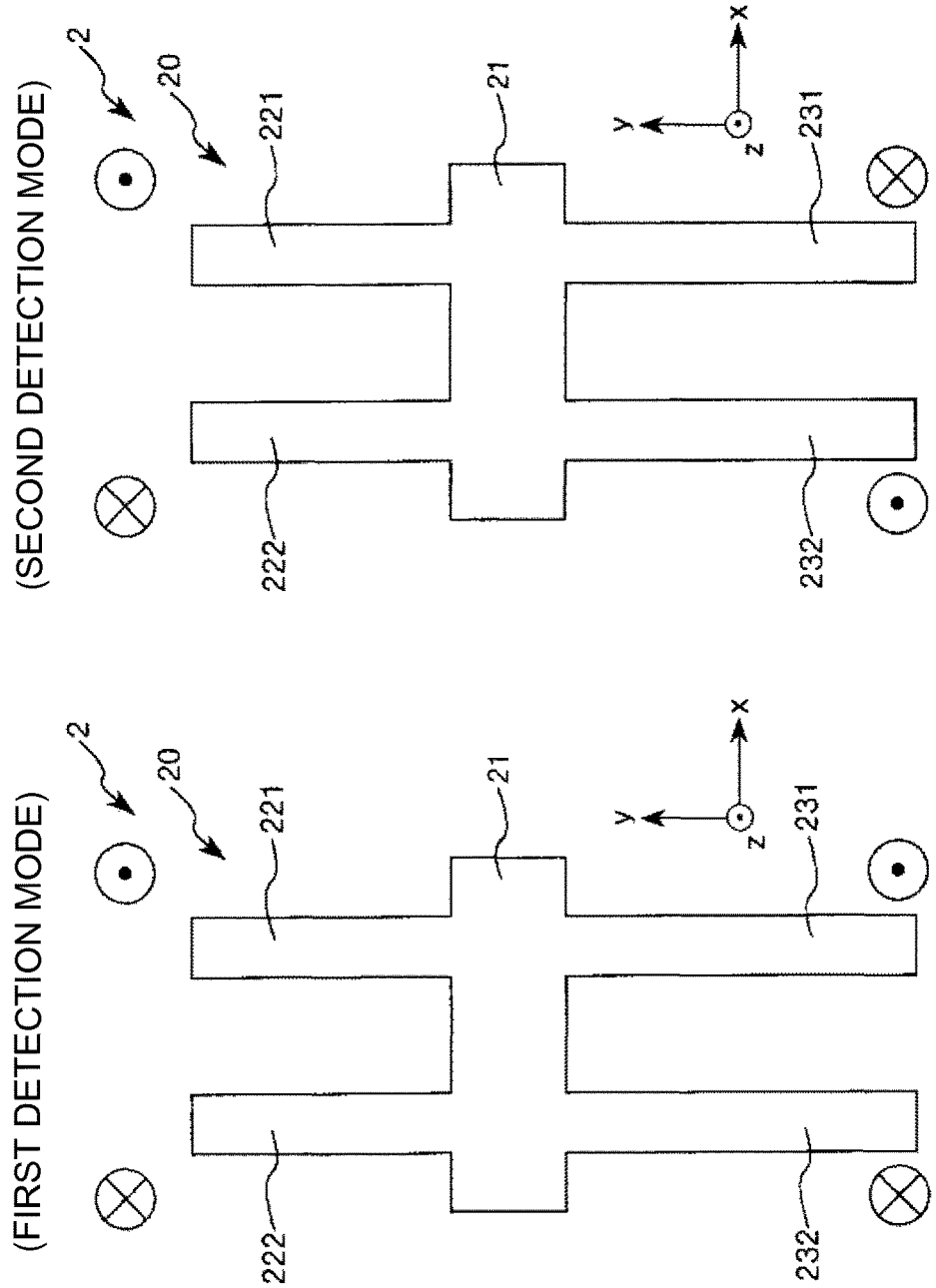
FIGS. 6A and 6B are diagrams for explaining detection modes of the vibrating element of the vibrator shown in FIG. 1.
Figure 7:
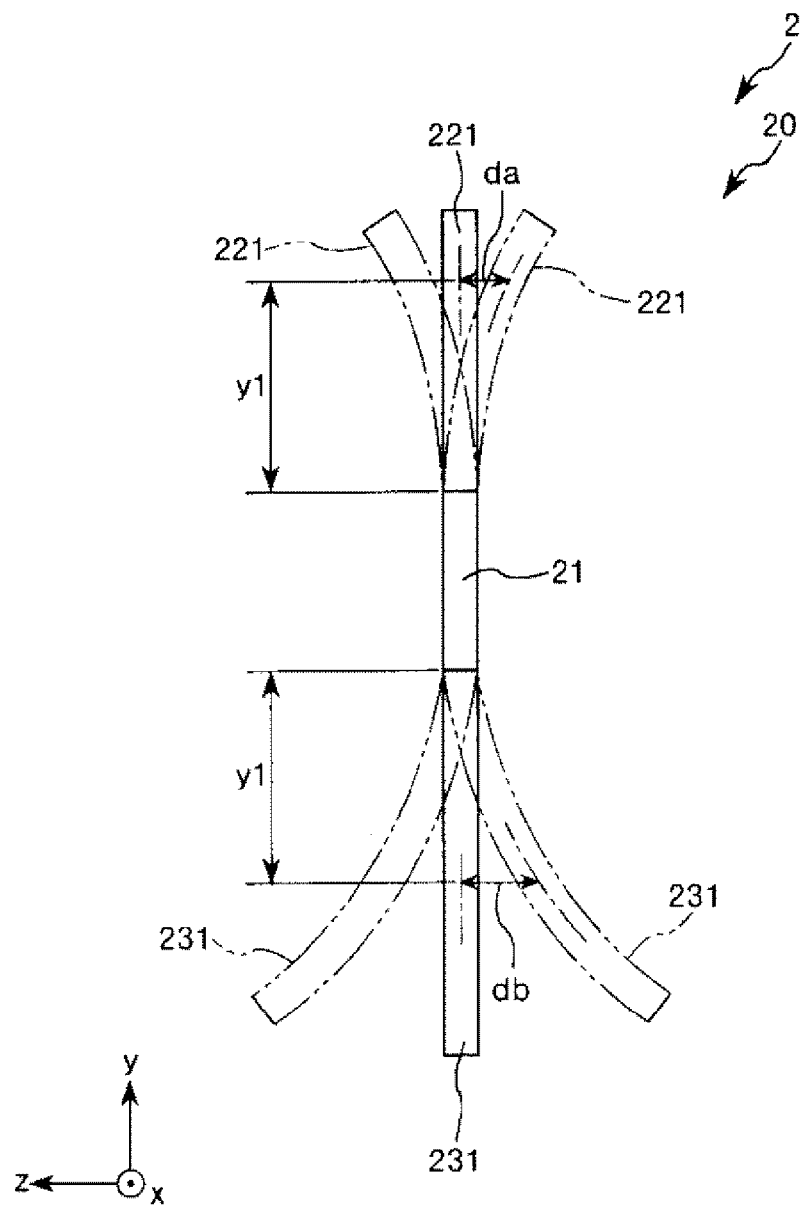
FIG. 7 is a diagram for explaining an amount of displacement da of the drive vibrating arm and an amount of displacement db of the detection vibrating arm of the vibrator shown in FIG. 1.
Figure 8:
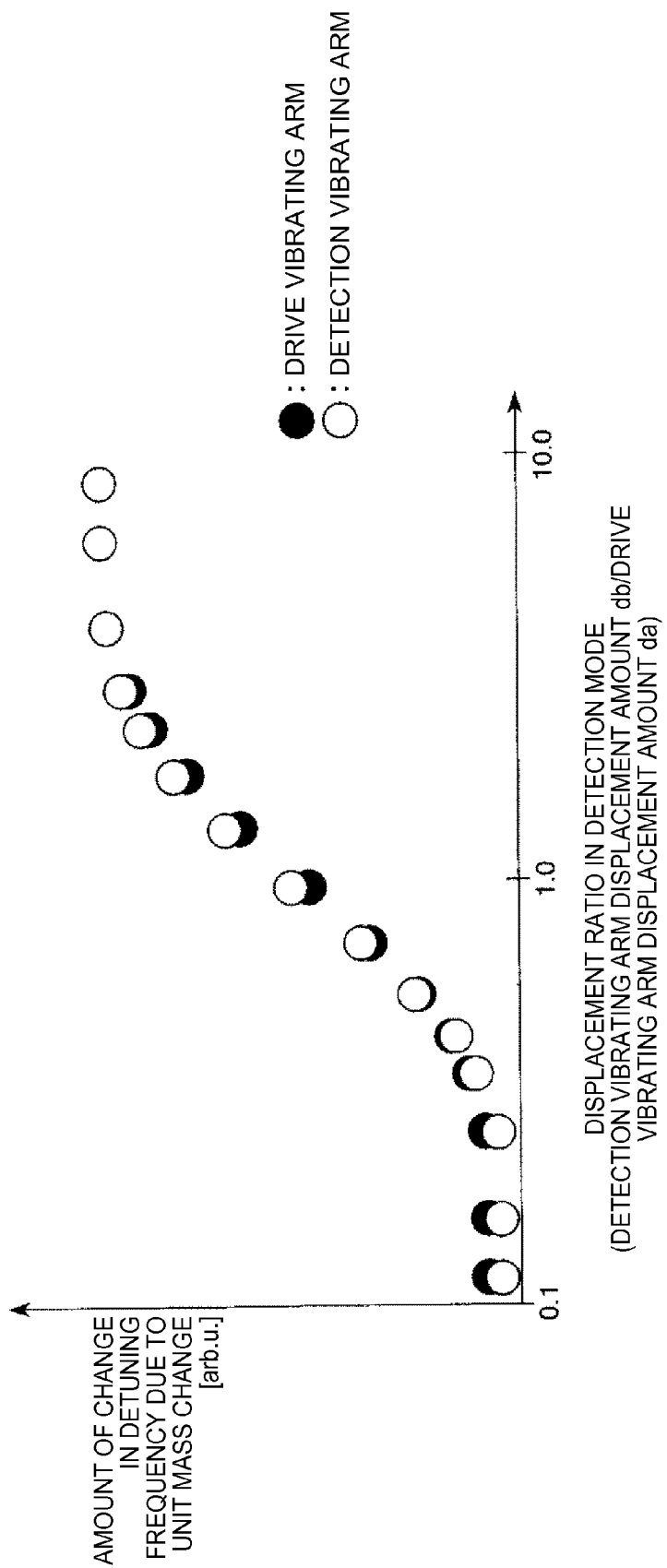
FIG. 8 is a graph showing a relationship between a ratio db/da of the amount of displacement db of the detection vibrating arm to the amount of displacement da of the drive vibrating arm of the vibrating element and the amount of change in detuning frequency per unit mass when changing the masses of the drive vibrating arm and the detection vibrating arm.

FIG. 1 is a plan view schematically showing a first embodiment of a vibrator (vibrating element) according to the invention. FIG. 2 is a cross-sectional view of the vibrator shown in FIG. 1. FIGS. 3A and 3B are diagrams showing a drive vibrating arm of the vibrator shown in FIG. 1, in which FIG. 3A is an enlarged plan view, and FIG. 3B is an enlarged cross-sectional view. FIGS. 4A and 4B are diagrams showing a detection vibrating arm of the vibrator shown in FIG. 1, in which FIG. 4A is an enlarged plan view, and FIG. 4B is an enlarged cross-sectional view. FIG. 5 is a perspective view of a main portion of the vibrating element of the vibrator shown in FIG. 1. FIGS. 6A and 6B are diagrams for explaining detection modes of the vibrating element of the vibrator shown in FIG. 1. FIG. 7 is a diagram for explaining an amount of displacement da of the drive vibrating arm and an amount of displacement db of the detection vibrating arm of the vibrator shown in FIG. 1. FIG. 8 is a graph showing a relationship between a ratio db/da of the amount of displacement db of the detection vibrating arm to the amount of displacement da of the drive vibrating arm of the vibrating element and the amount of change in detuning frequency per unit mass when changing the masses of the drive vibrating arm and the detection vibrating arm.

In the following, an x-axis (first axis), a y-axis (second axis), and a z-axis (third axis) are assumed as three axes orthogonal to (intersecting) each other for convenience of description, and are illustrated in FIGS. 1 to 5, in which a direction parallel to the x-axis is referred to as "x-axis direction", a direction parallel to the y-axis is referred to as "y-axis direction", and a direction parallel to the z-axis is referred to as "z-axis direction". Moreover, positive and negative directions of each of the directions are as indicated by arrows in the drawings.

The vibrator (sensor device) 1 shown in FIGS. 1 and 2 is a gyro sensor that detects an angular velocity.

The vibrator 1 can be used for, for example, camera-shake correction of imaging apparatuses, and attitude detection, attitude control, or the like for vehicles in mobile navigation systems using GPS (Global Positioning System) satellite signals.

The vibrator 1 includes a vibrating element 2 and a package 4 that accommodates the vibrating element 2.

The parts constituting the vibrator 1 will be sequentially described below.

The vibrating element 2 is a gyro sensor element that detects an angular velocity about one axis.

As shown in FIG. 1, the vibrating element 2 has the z-axis as its normal, and includes a vibrating substrate 20, drive electrode groups 51 and 52, and detection electrode groups 53 and 54.

The vibrating substrate 20 is a so-called "H-type" vibrating substrate including a base portion 21, a pair of drive vibrating arms 221 and 222, a pair of detection vibrating arms 231 and 232, a support portion 25, and four coupling portions 261, 262, 263, and 264. In the embodiment, the base portion 21, the drive vibrating arms 221 and 222, the detection vibrating arms 231 and 232, the support portion 25, and the coupling portions 261 to 264 are integrally formed of a piezoelectric material. The detection vibrating arm 231 is a first detection vibrating arm, and the detection vibrating arm 232 is a second detection vibrating arm.

Although not particularly limited, quartz crystal is preferably used as the piezoelectric material. Due to this, characteristics of the vibrating element 2 can be made excellent. Quartz crystal has three crystal axes, an X-axis (electrical axis), a Y-axis (mechanical axis), and a Z-axis (optic axis), orthogonal to each other. The base portion 21, the drive vibrating arms 221 and 222, the detection vibrating arms 231 and 232, the support portion 25, and the coupling portions 261 to 264 can be formed by, for example, performing an etching process on a substrate made of quartz crystal with the Z-axis along the thickness direction and a plate surface parallel to the X-axis and the Y-axis. The thickness of the substrate is appropriately set according to the oscillation frequency (resonance frequency), external size, workability, and the like of the vibrating element 2. In the embodiment, the case where the base portion 21, the drive vibrating arms 221 and 222, the detection vibrating arms 231 and 232, the support portion 25, and the coupling portions 261 to 264 are integrally made of quartz crystal will be described by way of example. Moreover, in the embodiment, the X-axis of the crystal axes coincides with the x-axis of the absolute coordinate axes, the Y-axis of the crystal axes coincides with the y-axis of the absolute coordinate axes, and the Z-axis of the crystal axes coincides with the z-axis of the absolute coordinate axes.

The base portion 21 is supported via the four coupling portions 261 to 264 to the support portion 25 formed so as to surround the base portion 21 in a plan view. Each of the four coupling portions 261 to 264 has a longitudinal shape with one end coupled to the base portion 21 and the other end coupled to the support portion 25. There are plural bends in each of the coupling portions 261 to 264 in the longitudinal direction thereof.

The base portion 21 has a rectangular shape with a pair of sides extending in the y-axis direction and a pair of sides extending in the x-axis direction as viewed from the z-axis direction. That is, the base portion 21 has a rectangular shape, as viewed in the plan view, with a pair of sides parallel to an extending direction of the drive vibrating arms 221 and 222 described later and a pair of sides vertical to the extending direction of the drive vibrating arms 221 and 222. Due to this, as will be described later, the detection vibrating arms 231 and 232 can be more efficiently vibrated (in-plane vibrated) in a second direction (directions of arrows E1 and E2 shown in FIG. 5) with drive vibrations of the drive vibrating arms 221 and 222 (refer to FIG. 5).

Moreover, as shown in FIG. 1, the base portion 21 in the embodiment has a quadrilateral shape, and it is preferable that the length of the base portion 21 in the x-axis direction is longer than the length thereof in the y-axis direction. That is, when the length of the base portion 21 in a direction vertical to the extending direction of the drive vibrating arms 221 and 222 in the plan view is L1, and the length of the base portion 21 in a direction parallel to the extending direction of the drive vibrating arms 221 and 222 in the plan view is L2, it is preferable to satisfy the relationship: L1>L2. By satisfying the relationship between L1 and L2, the detection vibrating arms 231 and 232 can be more efficiently vibrated in the second direction E1 and E2 with the drive vibrations of the drive vibrating arms 221 and 222.

Each of the drive vibrating arms 221 and 222 extends from the base portion 21 in the y-axis direction (positive y direction). Due to this, the drive vibrating arms 221 and 222 are provided so as to be parallel to each other. Moreover, the drive vibrating arms 221 and 222 are arranged spaced apart from each other in the x-axis direction. Due to this, the drive vibrating arms 221 and 222 can vibrate independently of each other. As shown in FIG. 3B, a cross-section of each of the drive vibrating arms 221 and 222 has a rectangular shape composed of a pair of sides parallel to the x-axis and a pair of sides parallel to the z-axis.

The drive vibrating arm 221 is provided with the drive electrode group 51. Similarly, the drive vibrating arm 222 is provided with the drive electrode group 52. The drive electrode group 51 will be representatively described below. Since the drive electrode group 52 is composed of four drive electrodes and is similar to the drive electrode group 51 described later, the description of the drive electrode group is omitted. A predetermined electrode of the drive electrode group 51 and a predetermined electrode of the drive electrode group 52 are electrically connected to each other via a wire (not shown).

As shown in FIGS. 3A and 3B, the drive electrode group 51 is composed of a drive electrode 511 provided on an upper surface of the drive vibrating arm 221, a drive electrode 512 provided on a lower surface of the drive vibrating arm 221, a drive electrode 513 provided on a left side surface of the drive vibrating arm 221, and a drive electrode 514 provided on a right side surface of the drive vibrating arm 221.

The drive electrode 511 and the drive electrode 512 are electrically connected to each other via a wire (not shown) so as to be at the same potential. The drive electrode 513 and the drive electrode 514 are electrically connected to each other via a wire (not shown) so as to be at the same potential. The drive electrodes 511 and 512 are electrically connected via wires (not shown) to a terminal 57*a* provided in the support portion 25 shown in FIG. 1. The drive electrodes 513 and 514 are electrically connected via wires (not shown) to a terminal 57*b* provided in the support portion 25 shown in FIG. 1. Drive electrodes 521 and 522 of the drive electrode group 52 are electrically connected to the drive electrodes 513 and 514. Drive electrodes 523 and 524 of the drive electrode group 52 are electrically connected to the drive electrodes 511 and 512.

Each of the detection vibrating arms 231 and 232 extends from the base portion 21 in the y-axis direction (negative y direction). Due to this, the detection vibrating arms 231 and 232 are provided so as to be parallel to each other. The detection vibrating arms 231 and 232 extend in a direction opposite to the drive vibrating arms 221 and 222. The detection vibrating arms 231 and 232 are arranged spaced apart from each other in the x-axis direction. Due to this, the detection vibrating arms 231 and 232 can vibrate independently of each other. As shown in FIG. 4B, a cross-section of each of the detection vibrating arms 231 and 232 has a rectangular shape composed of a pair of sides parallel to the x-axis and a pair of sides parallel to the z-axis. The detection vibrating arm 231 and the drive vibrating arm 221 are arranged coaxially with each other, and their positions in the x-axis direction and the z-axis direction coincide with each other. Similarly, the detection vibrating arm 232 and the drive vibrating arm 222 are arranged coaxially with each other, and their positions in the x-axis direction and the z-axis direction coincide with each other.

The detection vibrating arms 231 and 232 vibrate in a first direction (arrows C1 and D1, and C2 and D2 shown in FIG. 5) in response to physical quantities applied respectively to the drive vibrating arms 221 and 222, as will be described later, and also vibrate in the second direction (the arrows E1 and E2 shown in FIG. 5) different from the first direction with the drive vibrations of the drive vibrating arms 221 and 222.

As shown in FIG. 1, the detection vibrating arm 231 is provided with the detection electrode group 53. Similarly, the detection vibrating arm. 232 is provided with the detection electrode group 54. By providing the detection electrode groups 53 and 54 on the detection vibrating arms 231 and 232 that are provided separately from the drive vibrating arms 221 and 222 as described above, the electrode areas (areas of portions that function as electrodes) of the detection electrodes of the detection electrode groups 53 and 54 can be increased. Therefore, the detection sensitivity of the vibrating element 2 can be improved.

The detection electrode group 53 will be representatively described below. Since the detection electrode group 54 is composed of four detection electrodes and is similar to the detection electrode group 53, the description of the detection electrode group 54 is omitted.

As shown in FIGS. 4A and 4B, the detection electrode group 53 is composed of detection electrodes (first detection electrodes) 531 and 532 provided on an upper surface of the detection vibrating arm 231, and detection electrodes (first detection electrodes) 533 and 534 provided on a lower surface of the detection vibrating arm 231. The detection electrodes 531 and 533 are provided on one side (on the left side in FIGS. 4A and 4B) of the detection vibrating arm 231 in the width direction thereof. The detection electrodes 532 and 534 are provided on the other side (on the right side in FIGS. 4A and 4B) of the detection vibrating arm 231 in the width direction thereof.

The detection electrode 531 and the detection electrode 534 are electrically connected to each other via a wire (not shown) so as to be at the same potential. The detection electrode 532 and the detection electrode 533 are electrically connected to each other via a wire (not shown) so as to be at the same potential. The detection electrodes 531 and 534 are electrically connected via wires (not shown) to a terminal 57*c* provided in the support portion 25 shown in FIG. 1. The detection electrodes 532 and 533 are electrically connected via wires (not shown) to a terminal 57*e* provided in the support portion 25 shown in FIG. 1. The detection electrode group 54 is electrically connected via wires (not shown) to terminals 57*d* and 57*f* provided in the support portion 25 shown in FIG. 1.

In the vibrating element 2 configured as described above, a drive signal (drive voltage) is applied between the terminal 57*a* and the terminal 57*b*, that is, the drive electrode groups 51 and 52 are energized when using the vibrating element 2, whereby the drive vibrating arm 221 and the drive vibrating arm 222 flexurally vibrate (drive-vibrate) (are reciprocally driven in the x-axis direction) close to or away from each other as shown in FIG. 5. That is, a state where the drive vibrating arm 221 is flexed in a direction of an arrow A1 shown in FIG. 5 and the drive vibrating arm 222 is flexed in a direction of an arrow A2 shown in FIG. 5, and a state where the drive vibrating arm 221 is flexed in a direction of an arrow B1 shown in FIG. 5 and the drive vibrating arm 222 is flexed in a direction of an arrow B2 shown in FIG. 5 are alternately repeated. This state is a drive mode.

When an angular velocity ω about the y-axis is applied to the vibrating element 2 in the state where the drive vibrating arms 221 and 222 are drive-vibrated, the drive vibrating arms 221 and 222 flexurally vibrate (are reciprocally driven in the z-axis direction) in opposite directions along the z-axis direction with the Coriolis force. Consequently, the detection vibrating arms 231 and 232 flexurally vibrate (detection-vibrate) (are reciprocally driven in the z-axis direction) in opposite directions along the z-axis direction (the first direction). That is, a state where the drive vibrating arm 221 is flexed in a direction of the arrow C1 shown in FIG. 5 and the drive vibrating arm 222 is flexed in a direction of the arrow C2 shown in FIG. 5, and a state where the detection vibrating arm 231 is flexed in a direction of the arrow D1 or D2 shown in FIG. 5 and the detection vibrating arm 232 is flexed in a direction of the arrow D2 or D1 shown in FIG. 5 are alternately repeated. This state is a detection mode.

By detecting charge generated at the detection electrode groups 53 and 54 due to the detection vibrations of the detection vibrating arms 231 and 232, the angular velocity ω applied to the vibrating element 2 can be obtained.

The detection mode includes a first detection mode shown in FIG. 6A and a second detection mode shown in FIG. 6B. The resonance frequency of detection vibrations of the detection vibrating arms 231 and 232 is different between the first detection mode and the second detection mode.

In the first detection mode shown in FIG. 6A, the drive vibrating arm 221 and the detection vibrating arm 231 that are arranged coaxially with each other vibrate in opposite directions along the z-axis direction. Similarly, the drive vibrating arm 222 and the detection vibrating arm 232 that are arranged coaxially with each other vibrate in opposite directions along the z-axis direction.

In the second detection mode shown in FIG. 6B, the drive vibrating arm 221 and the detection vibrating arm 231 that are arranged coaxially with each other vibrate in the same direction along the z-axis direction. Similarly, the drive vibrating arm 222 and the detection vibrating arm 232 that are arranged coaxially with each other vibrate in the same direction along the z-axis direction.

Symbols "●" and "x" in FIGS. 6A and 6B each indicate a direction of displacement in vibrations of the corresponding drive vibrating arms 221 and 222 and the corresponding detection vibrating arms 231 and 232. Symbol "●" indicates that the direction of displacement is from the back to the front of the paper of FIGS. 6A and 6B, while Symbol "x" indicates that the direction of displacement is from the front to the back of the paper of FIGS. 6A and 6B.

As shown in FIG. 2, the package 4 includes a base member (base) 41 having a recess that opens upward, and a lid member (lid) 42 provided so as to cover the recess of the base member 41. With the base member 41 and the lid member 42, an interior space for accommodating the vibrating element 2 is formed.

The base member 41 is composed of a flat plate body (plate portion) 411 and a frame body (frame portion) 412 bonded to an outer peripheral portion of an upper surface of the plate body 411.

The base member 41 is made of, for example, aluminum oxide sintered body, quartz crystal, glass, or the like.

As shown in FIG. 2, the support portion 25 of the vibrating element 2 is bonded to an upper surface (surface on the side covered with the lid member 42) of the plate body 411 of the base member 41 with bonding members 81 such as an adhesive made by including, for example, epoxy resin, acrylic resin, or the like. Due to this, the vibrating element 2 is supported and fixed to the base member 41.

Further, as shown in FIGS. 1 and 2, a plurality of internal terminals 71 are provided on the upper surface of the base member 41.

The terminals 57a to 57f of the vibrating element 2 are electrically connected to the plurality of internal terminals 71 via, for example, wires composed of bonding wires.

On the other hand, a plurality of external terminals 73 used when mounting the vibrator 1 to an apparatus (external apparatus) into which the vibrator 1 is incorporated are provided on a lower surface (bottom surface of the package 4) of the plate body 411 of the base member 41.

The plurality of external terminals 73 are electrically connected to the plate body 411 via internal wires (not shown). Due to this, the plate body 411 and the plurality of external terminals 73 are electrically connected.

Each of the internal terminals 71 and the external terminals 73 is made of, for example, a metal coating formed by stacking a coating of nickel (Ni), gold (Au), or the like on a metallization layer of tungsten (W) or the like by plating or the like.

The lid member 42 is hermetically bonded to the base member 41. Due to this, the package 4 is hermetically sealed.

The lid member 42 is made of, for example, the same material as that of the base member 41, or metal such as Kovar, 42 Alloy, or stainless steel.

A bonding method of the base member 41 and the lid member 42 is not particularly limited, and, for example, a bonding method using a brazing material, an adhesive made of curable resin or the like, a welding method such as seam welding or laser welding, or the like can be used. Such bonding is conducted under a reduced pressure or an inert gas atmosphere, so that the interior of the package 4 can be maintained in the reduced-pressure state or the inert gas sealed state.

As shown in FIG. 7, the vibrating element 2 of the vibrator 1 is configured such that when the drive electrodes 511 to 514 and 521 to 524 are energized and the vibrating element 2 is subjected to rotation about the y-axis while the drive vibrating arms 221 and 222 vibrating (drive-vibrating) in the x-axis direction, that is, in a state where the drive vibrating arms 221 and 222 vibrate in the z-axis direction and the detection vibrating arms 231 and 232 vibrate (detection-vibrate) in the z-axis direction, an amount of displacement db of the detection vibrating arms 231 and 232 in the z-axis direction at a position distant from the base portion 21 by a distance y1 along the y-axis direction is greater than an amount of displacement da of the drive vibrating arms 221 and 222 in the z-axis direction at a position distant from the base portion 21 by the same distance y1 along the y-axis direction. In the embodiment, the distance y1 is 80% of a length of the shorter of the drive vibrating arms 221 and 222 and the detection vibrating arms 231 and 232 in the longitudinal direction (the y-axis direction), that is, 80% of a length La of the drive vibrating arms 221 and 222.

Due to this, in each of the case where the mass of the drive vibrating arms 221 and 222 is changed and the case where the mass of the detection vibrating arms 231 and 232 is changed, the amount of change in detuning frequency per unit mass can be increased. The detuning frequency is a difference (the absolute value of the difference) between the resonance frequency of drive vibrations of the drive vibrating arms 221 and 222 and the resonance frequency of detection vibrations of the detection vibrating arms 231 and 232.

FIG. 8 is a graph showing a relationship between a ratio db/da of the amount of displacement db of the detection vibrating arms 231 and 232 to the amount of displacement da of the drive vibrating arms 221 and 222 and the amount of change in detuning frequency per unit mass when changing the masses of the drive vibrating arms 221 and 222 and the detection vibrating arms 231 and 232. As shown in FIG. 8, it can be seen that when db/da is greater than 1, the amount of change in detuning frequency per unit mass becomes great either when the mass of the detection vibrating arms 231 and 232 is changed or the mass of the drive vibrating arms 221 and 222 is changed.

The ratio db/da of the amount of displacement db of the detection vibrating arms 231 and 232 to the amount of displacement da of the drive vibrating arms 221 and 222 is not particularly limited as long as the ratio is greater than 1. The ratio is appropriately set according to conditions, and preferably 1.5 or more and 9 or less. When db/da is smaller than the lower limit, the amount of change in detuning frequency per unit mass may be insufficient depending on the other conditions. Moreover, when db/da is greater than the upper limit, the sensitivity may be insufficient depending on the other conditions. The sensitivity is the maximum when db/da is 1.

When importance is placed on the sensitivity, db/da is preferably 1.5 or more and 2.5 or less. Even when, for example, db/da is 2.5, it is possible for the sensitivity to ensure about 70% of the maximum sensitivity.

Moreover, when much importance is not placed on the sensitivity and it is desired to further increase the amount of change in detuning frequency per unit mass, db/da is preferably 2.5 or more and 9 or less.

Moreover, as shown in FIG. 5, the detection vibrating arms 231 and 232 are formed to be longer than the drive vibrating arms 221 and 222 in the embodiment, which is employed as a configuration for making the amount of displacement db of the detection vibrating arms 231 and 232 greater than the amount of displacement da of the drive vibrating arms 221 and 222.

Strictly speaking, the resonance frequency of vibrations of the detection vibrating arms 231 and 232 in the z-axis direction is lower than the resonance frequency of vibrations of the drive vibrating arms 221 and 222 in the z-axis direction. Moreover, the detuning frequency in the first detection mode is lower than the detuning frequency in the second detection mode.

According to the vibrating element 2 as has been described above, in each of the case where the mass of the drive vibrating arms 221 and 222 is changed and the case where the mass of the detection vibrating arms 231 and 232 is changed, the amount of change in detuning frequency per unit mass can be increased. Due to this, in the adjustment of the detuning frequency, changes in the mass, shape, and the like of the drive vibrating arms 221 and 222 and the detection vibrating arms 231 and 232 can be reduced, which makes it possible to prevent deterioration of the characteristics of the vibrating element 2.

Second Embodiment

Figure 9:
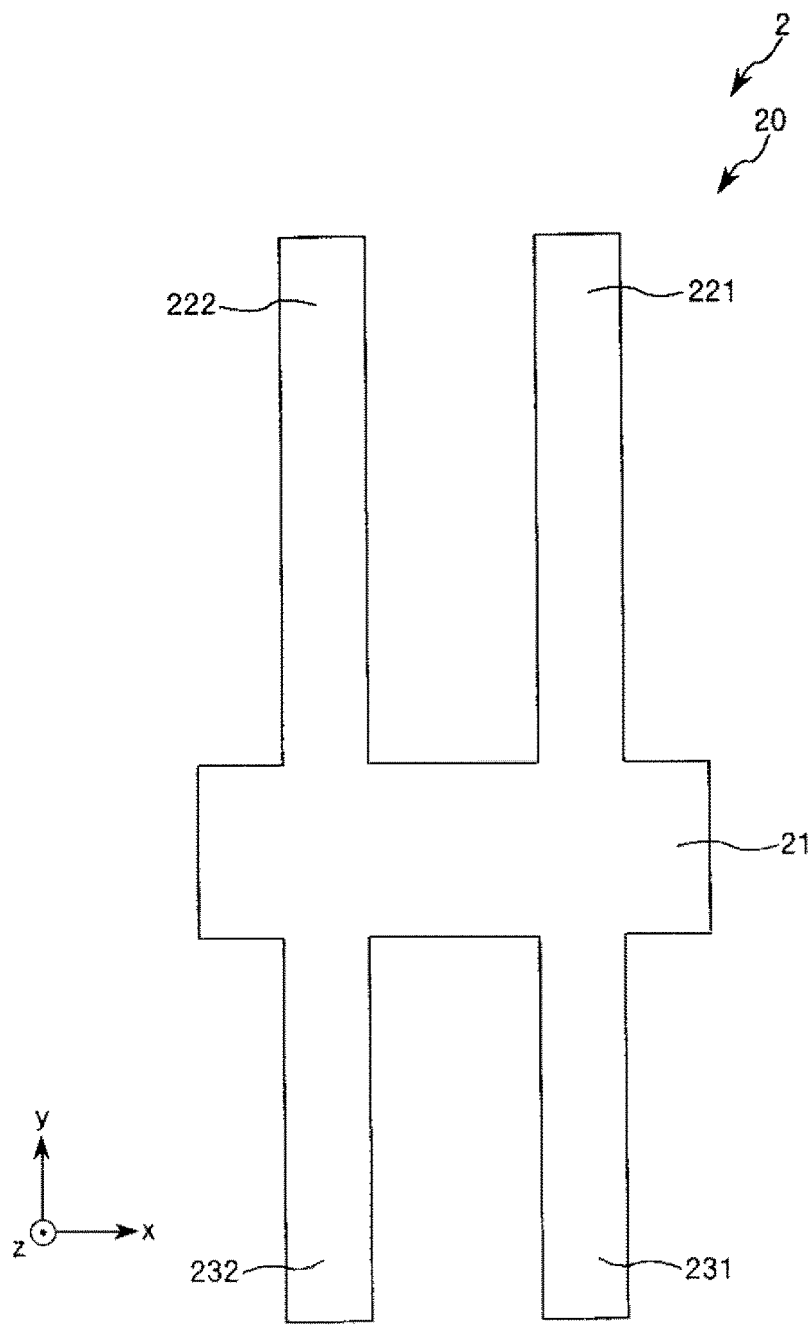
FIG. 9 is a perspective view showing a main portion of a second embodiment of a vibrating element according to the invention.

FIG. 9 is a perspective view showing a main portion of a second embodiment of a vibrating element according to the invention.

The second embodiment will be described below mainly on differences from the first embodiment, and a description of similarities is omitted.

The second embodiment is similar to the first embodiment excepting that the configurations of the drive vibrating arms and the detection vibrating arms are different.

As shown in FIG. 9, in the vibrating element 2 of the second embodiment, the detection vibrating arms 231 and 232 are formed to be shorter than the drive vibrating arms 221 and 222.

Strictly speaking, the resonance frequency of vibrations of the detection vibrating arms 231 and 232 in the z-axis direction is higher than the resonance frequency of vibrations of the drive vibrating arms 221 and 222 in the z-axis direction. Moreover, the detuning frequency in the first detection mode is higher than the detuning frequency in the second detection mode.

According to the vibrating element 2, advantageous effects similar to those of the first embodiment are obtained.

Embodiment of Electronic Apparatus

Next, electronic apparatuses to which the vibrating element 2 is applied will be described in detail based on FIGS. 10 to 12.

Figure 10:
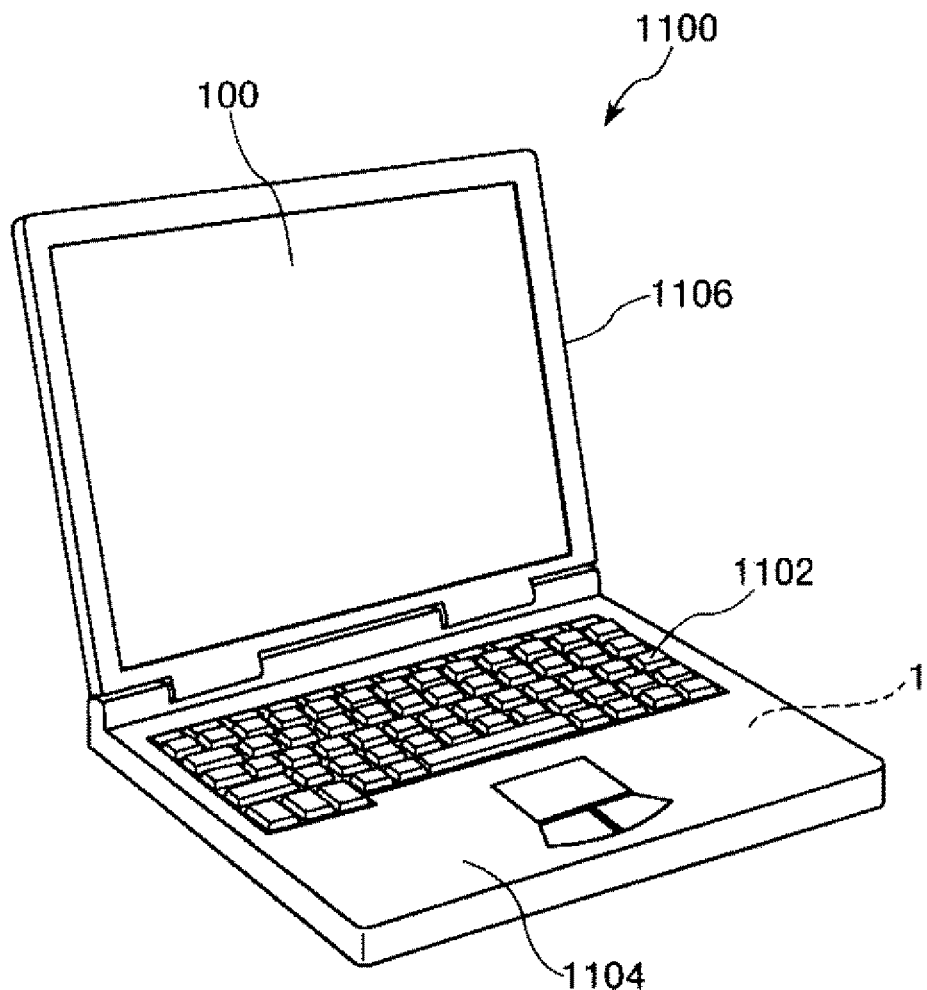
FIG. 10 is a perspective view showing a configuration of a mobile (or notebook) personal computer using the vibrating element according to the invention.

FIG. 10 is a perspective view showing a configuration of a mobile (or notebook) personal computer to which the electronic apparatus including the vibrating element according to the invention is applied.

In the drawing, the personal computer 1100 is composed of a main body portion 1104 including a keyboard 1102 and a display unit 1106 including a display portion 1108. The display unit 1106 is rotatably supported relative to the main body portion 1104 via a hinge structure portion. In the personal computer 1100, the vibrator 1 (the vibrating element 2) that functions as an angular velocity detecting unit (gyro sensor) is built.

Figure 11:
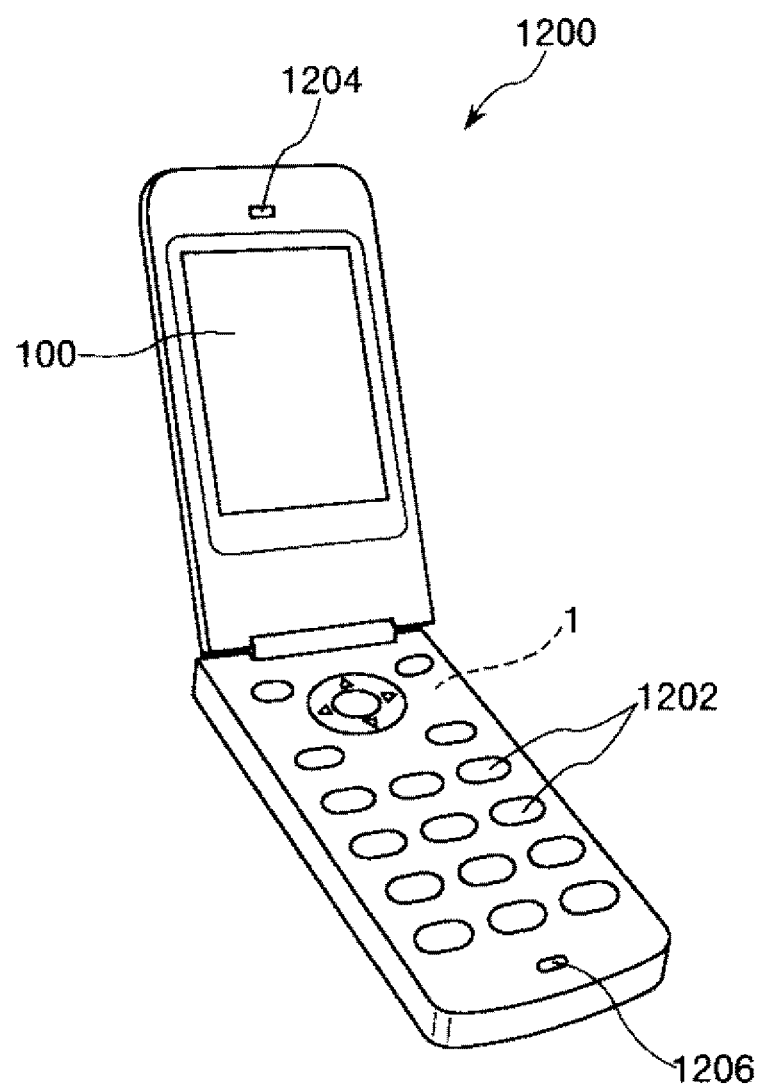
FIG. 11 is a perspective view showing a configuration of a mobile phone (including a PHS) using the vibrating element according to the invention.

FIG. 11 is a perspective view showing a configuration of a mobile phone (including a PHS) to which the electronic apparatus including the vibrating element according to the invention is applied.

In the drawing, the mobile phone 1200 includes a plurality of operation buttons 1202, an earpiece 1204, and a mouthpiece 1206. A display portion 1208 is arranged between the operation buttons 1202 and the earpiece 1204. In the mobile phone 1200, the vibrator 1 (the vibrating element 2) that functions as an angular velocity detecting unit (gyro sensor) is built.

Figure 12:
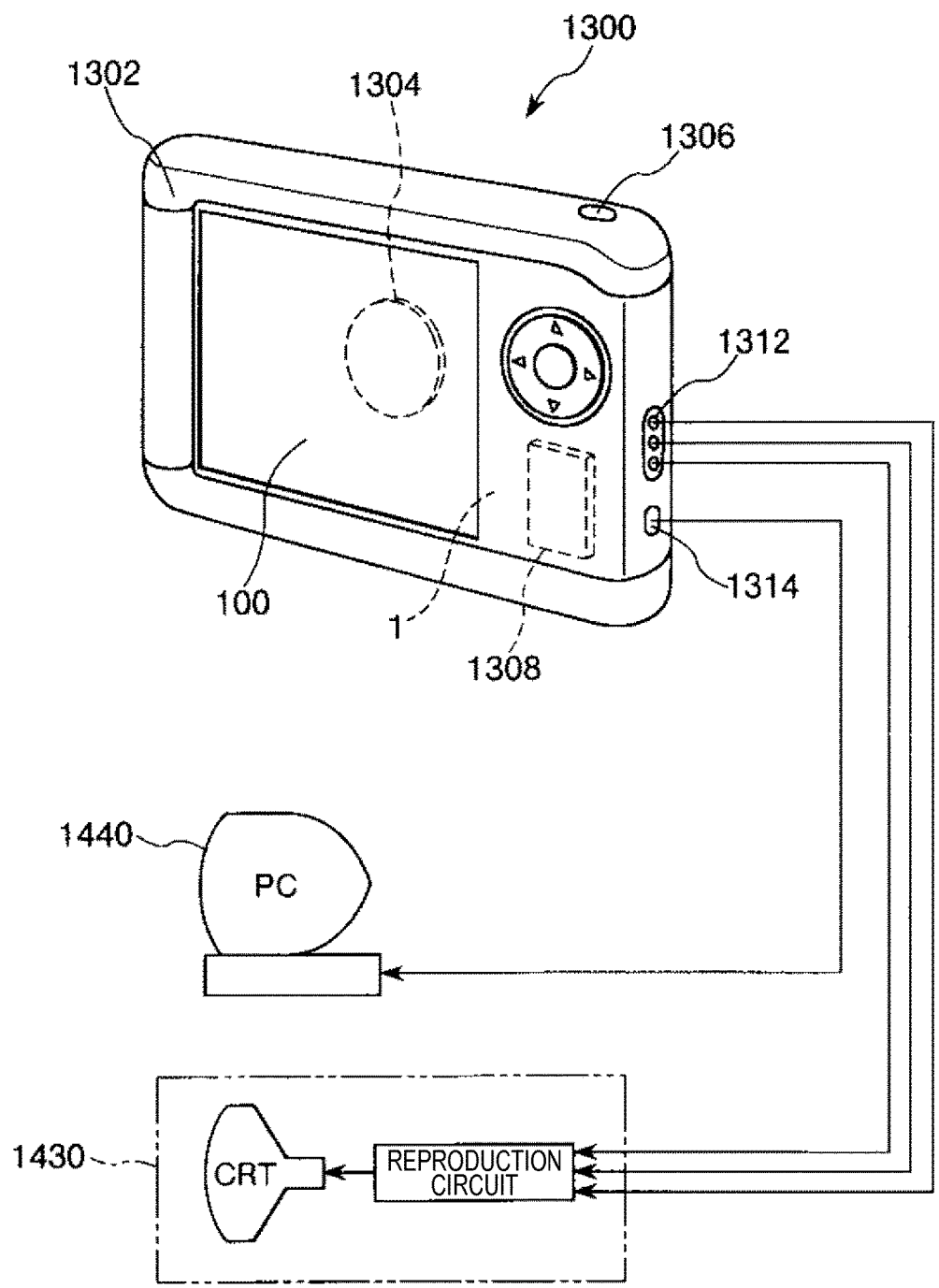
FIG. 12 is a perspective view showing a configuration of a digital still camera using the vibrating element according to the invention.

FIG. 12 is a perspective view showing a configuration of a digital still camera to which the electronic apparatus including the vibrating element according to the invention is applied. In the drawing, connections with external apparatuses are also shown in a simplified manner. Here, usual cameras expose a silver halide photographic film with an optical image of a subject, whereas the digital still camera 1300 photoelectrically converts the optical image of the subject with an imaging element such as a CCD (Charge Coupled Device) to generate imaging signals (image signals).

A display portion 1310 is provided on a back surface of a case (body) 1302 in the digital still camera 1300 and configured to perform display based on imaging signals generated by the CCD. The display portion 1310 functions as a finder that displays the subject as an electronic image.

Moreover, on the front side (the rear side in the drawing) of the case 1302, a light receiving unit 1304 including an optical lens (imaging optical system) and the CCD is provided.

When a photographer confirms the subject image displayed on the display portion and presses down a shutter button 1306, imaging signals of the CCD at the time are transferred to and stored in a memory 1308.

In the digital still camera 1300, a video signal output terminal 1312 and a data communication input/output terminal 1314 are provided on a side surface of the case 1302. Then, as shown in the drawing, a television monitor 1430 and a personal computer 1440 are connected as necessary to the video signal output terminal 1312 and the data communication input/output terminal 1314, respectively. Further, the imaging signals stored in the memory 1308 are output to the television monitor 1430 or the personal computer 1440 by a predetermined operation.

In the digital still camera 1300, the vibrator 1 (the vibrating element 2) that functions as an angular velocity detecting unit (gyro sensor) is built.

In addition to the personal computer (mobile personal computer) in FIG. 10, the mobile phone in FIG. 11, and the digital still camera in FIG. 12, the electronic apparatus including the vibrating element can be applied to, for example, inkjet ejection apparatus (for example, inkjet printers), laptop personal computers, television sets, video camera, video tape recorders, car navigation systems, pagers, electronic notebooks (including those with communication function), electronic dictionaries, calculators, electronic gaming machines, word processors, workstations, videophones, surveillance television monitors, electronic binoculars, POS terminals, medical apparatuses (for example, electronic thermometers, sphygmomanometers, blood glucose meters, electrocardiogram measuring systems, ultrasonic diagnosis apparatuses, and electronic endoscopes), fishfinders, various types of measuring instrument, indicators (for example, indicators used in vehicles, aircraft, and ships), and flight simulators.

Embodiment of Moving object

Next, a moving object to which the vibrating element is applied will be described in detail based on FIG. 13.

Figure 13:
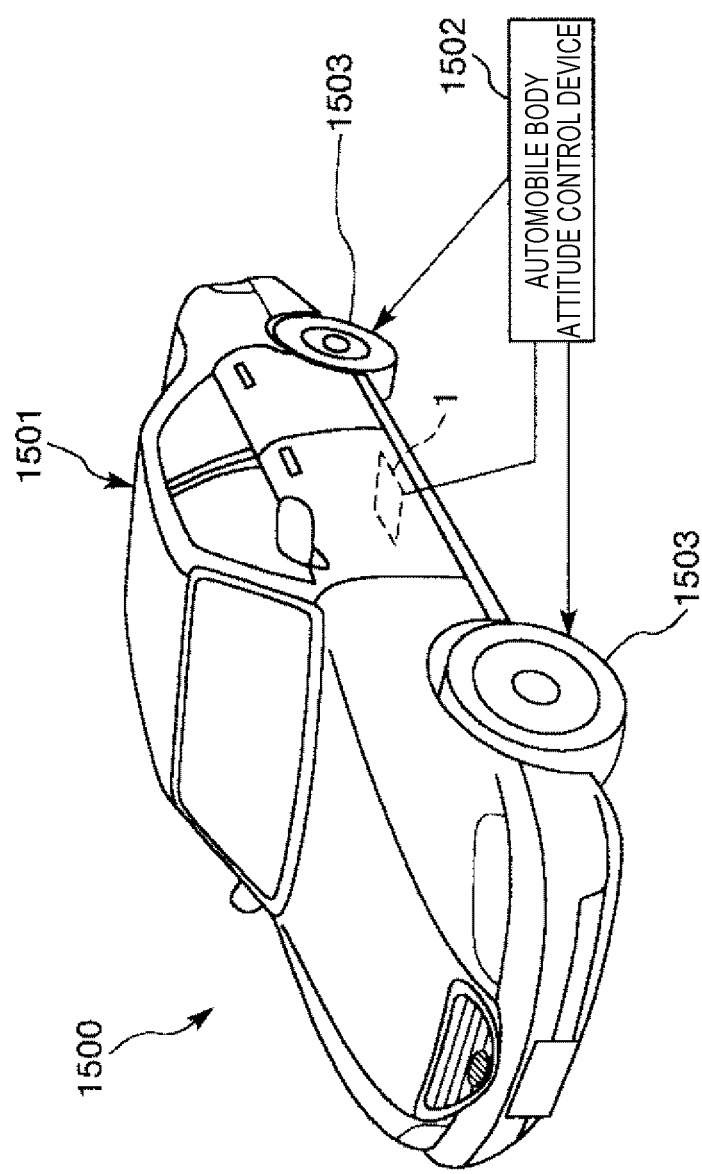
FIG. 13 is a perspective view showing a configuration of an automobile to which a moving object using the vibrating element according to the invention is applied.

FIG. 13 is a perspective view showing a configuration of an automobile to which the moving object including the vibrating element according to the invention is applied.

In the automobile 1500, the vibrator 1 (the vibrating element 2) that functions as an angular velocity detecting unit (gyro sensor) is built, so that the attitude of an automobile body 1501 can be detected by the vibrating element 2. Detection signals of the vibrating element 2 are supplied to an automobile body attitude control device 1502. The automobile body attitude control device 1502 can detect the attitude of the automobile body 1501 based on the signals, and control the hardness and softness of a suspension according to the detected result, or control braking of individual wheels 1503. In addition, such attitude control can be utilized for bipedal walking robots or radio-controlled helicopters. As described above, the vibrator 1 (the vibrating element 2) is incorporated for realizing the attitude control of various types of moving objects.

Although the vibrating element, the vibrator, the electronic apparatus, and the moving object according to the invention have been described above based on the embodiments shown in the drawings, the invention is not limited to the embodiments. The configuration of each part can be replaced with any configuration having a similar function. Moreover, any other configuration may be added to the invention.

In the embodiment described above, as configuration examples for making the amount of displacement db of the detection vibrating arm greater than the amount of displacement da of the drive vibrating arm, an example of forming the detection vibrating arm to be longer than the drive vibrating arm and an example of forming the detection vibrating arm to be shorter than the drive vibrating arm are shown. However, the configuration is not limited to the examples.

In the embodiment described above, the number of vibrating arms is four. However, the number is not limited to four, and may be, for example, two, three, or five or more.

In the embodiment described above, the so-called "H-type" vibrating element has been described by way of example. However, the vibrating element is not limited to the type, and can be applied to various types of vibrating elements (gyro elements).

The entire disclosure of Japanese Patent Application No. 2013-226086, filed Oct. 31, 2013 is expressly incorporated by reference herein.

What is claimed is:

1. A vibrating element that, when assuming that a first axis, a second axis and a third axis are mutually orthogonal and intersect each other, comprises:
   a base portion;
   at least one drive vibrating arm connected to the base portion and extending in a direction of the second axis; and
   at least one detection vibrating arm connected to the base portion at a position different from the drive vibrating arm and extending in the direction of the second axis, wherein the vibrating element is configured such that when the vibrating element is subjected to rotation about the second axis while the drive vibrating arm is being reciprocally driven in a direction of the first axis, an amount of displacement of the detection vibrating arm in a direction of the third axis at a position distant from the base portion by a distance y1 along the direction of the second axis is greater than an amount of displacement of the drive vibrating arm in the direction of the third axis at a position distant from the base portion by the distance y1 along the direction of the second axis.

2. The vibrating element according to claim 1, wherein when the amount of displacement of the detection vibrating arm is db and the amount of displacement of the drive vibrating arm is da, a ratio db/da of the amount of displacement db to the amount of displacement da is 1.5 or more and 9 or less.

3. A vibrator comprising:
   the vibrating element according to claim 2; and
   a package accommodating the vibrating element.

4. An electronic apparatus comprising the vibrating element according to claim 2.

5. A moving object comprising the vibrating element according to claim 2.

6. The vibrating element according to claim 1, comprising a pair of the drive vibrating arms and a pair of the detection vibrating arms arranged coaxially with the pair of drive vibrating arms, wherein
   when the vibrating element is subjected to rotation about the second axis while the pair of drive vibrating arms are being reciprocally driven in the direction of the first axis, the pair of drive vibrating arms are reciprocally driven in opposite directions along the direction of the third axis, and the pair of detection vibrating arms are reciprocally driven in opposite directions along the direction of the third axis, and
   the drive vibrating arm and the detection vibrating arm arranged coaxially with each other in the pair of drive vibrating arms and the pair of detection vibrating arms are reciprocally driven in opposite directions.

7. A vibrator comprising:
   the vibrating element according to claim 6; and
   a package accommodating the vibrating element.

8. An electronic apparatus comprising the vibrating element according to claim 6.

9. A moving object comprising the vibrating element according to claim 6.

10. The vibrating element according to claim 1, comprising a pair of the drive vibrating arms and a pair of the detection vibrating arms arranged coaxially with the pair of drive vibrating arms, wherein
   when the vibrating element is subjected to rotation about the second axis while the pair of drive vibrating arms are being reciprocally driven in the direction of the first axis, the pair of drive vibrating arms are reciprocally driven in opposite directions along the direction of the third axis, and the pair of detection vibrating arms are reciprocally driven in opposite directions along the direction of the third axis, and the drive vibrating arm and the detection vibrating arm arranged coaxially with each other in the pair of drive vibrating arms and the pair of detection vibrating arms are reciprocally driven in the same direction.

11. A vibrator comprising:
the vibrating element according to claim 10; and
a package accommodating the vibrating element.

12. An electronic apparatus comprising the vibrating element according to claim 10.

13. A moving object comprising the vibrating element according to claim 10.

14. The vibrating element according to claim 1, wherein the detection vibrating arm is longer than the drive vibrating arm.

15. A vibrator comprising:
the vibrating element according to claim 14; and
a package accommodating the vibrating element.

16. An electronic apparatus comprising the vibrating element according to claim 14.

17. The vibrating element according to claim 1, wherein the detection vibrating arm is shorter than the drive vibrating arm.

18. A vibrator comprising:
the vibrating element according to claim 1; and
a package accommodating the vibrating element.

19. An electronic apparatus comprising the vibrating element according to claim 1.

20. A moving object comprising the vibrating element according to claim 1.

* * * * *